United States Patent Office 2,949,475
Patented Aug. 16, 1960

2,949,475

3,17-BISOXYGENATED 16-HALOESTRENES AND INTERMEDIATE

William F. Johns, Morton Grove, Ill., assignor to G. D. Searle & Co., Chicago, Ill., a corporation of Delaware No Drawing. Filed May 18, 1959, Ser. No. 813,671

6 Claims. (Cl. 260—397.3)

The present invention relates to 16-halogenated steroids which contain a monounsaturated A ring and to an intermediate in the manufacture of same. The compounds especially contemplated are 3,17-bisoxygenated 16-haloestrenes of the structural formulae

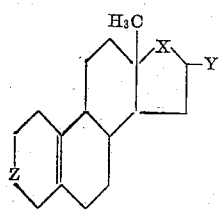

and

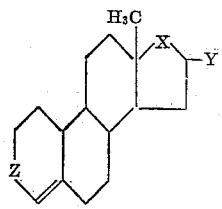

wherein X and Z are selected from the group consisting of carbonyl, hydroxymethylene, and (lower alkanoyl)oxymethylene radicals; and Y is a halogen atom having an atomic weight greater than 34. The lower alkanoyl radicals encompassed by X and Z are, for example, formyl, acetyl, propionyl, butyryl, valeryl, caproyl, enanthyl, caprylyl, and the branched-chain isomers thereof; said groups being the acyl radicals of alkanoic acids containing fewer than 9 carbon atoms.

A starting material suitable for the manufacture of the compounds of this invention is estr-5(10)-ene-3,17-dione. Reduction of this diketone, typically with sodium borohydride in aqueous methanol, results in 3β-hydroxy-estr-5(10)-en-17-one which can be converted to the enol acetate, 3β,17-diacetoxyestra-5(10),16-diene, by treatment with isopropenyl acetate in the presence of a catalytic quantity of p-toluenesulfonic acid. This enol acetate is transformed into a 16α-halogenated 17-ketone of this invention by reaction with the appropriate halogen in a suitable inert solvent. As a specific example of the process involved, 3β,17-diacetoxyestra-5(10),16-diene is reacted with chlorine in carbon tetrachloride to afford 3β-acetoxy-16α-chloroestr-5(10)-en-17-one. These 3β-(lower alkanoates) are hydrolyzed, typically in methanol with aqueous hydrochloric acid, to afford the corresponding 16α-halo-3β-hydroxyestr-5(10)-en-17-ones.

The instant 16α-halo-3,17-diones can be prepared by oxidation of the aforementioned 3β-hydroxy derivatives. For example, 16α-chloro-3β-hydroxyestr-5(10)-en-17-one is reacted with a solution of chromium trioxide in aqueous sulfuric acid to afford 16α-chloroestr-5(10)-ene-3,17-dione. On the other hand, when the 16α-halo-3β-hydroxyestr-5(10)-en-17-ones or their 3β-(lower alkanoates) are treated with a reducing agent in a suitable medium, the 16α-halo-3β,17-diols of this invention result. For instance, 3β-acetoxy-16α-chloroestr-5(10)-en-17-one tetrahydrofuran is reacted with lithium aluminum hydride in ether to yield 16α-chloroestr-5(10)-en-3β,17-diol. Selective oxidation of these diols, typically by treatment with a limited quantity of chromium trioxide in aqueous sulfuric acid, results in the instant 16α-halo-17-hydroxyestr-5(10)-en-3-ones; whereas reaction of the diols with a lower alkanoic acid anhydride in pyridine yields the corresponding 3β,17-di-(lower alkanoates).

By methods which are well-known to those persons skilled in the art, the 16β-isomers of the aforementioned 16α-halo compounds can be manufactured. For instance, the 16β-chloro and 16β-bromo isomers are prepared by treating the corresponding 16α-iodo compounds of this invention with the appropriate lithium halide. The 16β-iodo isomers, however, are preferably prepared by way of the aforementioned enol acetate, 3β,17-diacetoxyestra-5(10),16-diene. Treatment of the latter compound with N-iodosuccinimide in a suitable inert solvent such as dioxane yields 3β-acetoxy-16β-iodoestr-5(10)-en-17-one which can be converted, as is specified supra, to the other 16β-iodo compounds of this invention.

The instant 16-haloestr-4-ene-3,17-diones can be prepared by Oppenauer oxidation of the aforementioned 16-halo-3β-hydroxyestr-5(10)-en-17-ones. As a specific example, 16α-chloro-3β-hydroxyestr-5(10)-en-17-one is reacted with aluminum isopropoxide and cyclohexanone in toluene, to afford 16α-chloroestr-4-ene-3,17-dione. As will be evident to those persons skilled in the art, derivatives of the latter dione can be obtained by the processes described supra.

The 3β,17-bisoxygenated 16-haloestrenes of this invention are useful as a result of their valuable pharmacological properties. They have, for example, the capacity to decrease the serum cholesterol/phospholipid ratio without at the same time producing the potent feminizing side effects characteristic of known estrogens adapted to regulation of cholesterol metabolism. They have also antihormonal properties as exemplified by their ability to inhibit the salt-retaining effect of desoxycorticosterone acetate. In addition, they are androgenic agents.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees Centigrade (° C.). Quantities of materials are expressed in parts by weight except where otherwise noted.

*Example 1*

To a solution of 165 parts of estr-5(10)-ene-3,17-dione in 3200 parts of methanol is added, at 10–15°, a solution of 6.2 parts of sodium borohydride in 150 parts of water; and the mixture is stirred for 45 minutes. The reaction mixture is treated with 85 parts of acetic acid and the resulting solution poured into 4000 parts of water. The resulting precipitate is collected by filtration, washed with water, dried, and dissolved in benzene. Adsorption of the benzene solution on 1700 parts of silica gel followed by elution with a 10% ethyl acetate-90% benzene solution and recrystallization from acetone-petroleum ether affords 3β-hydroxyestr-5(10)-en-17-one, M.P. 192–194°; [α]$_D$=+270°.

*Example 2*

A mixture of 53 parts of 3β-hydroxyestr-5(10)-en-17-one, 7 parts of p-toluenesulfonic acid and 630 parts of isopropenyl acetate is distilled slowly to approximately half-volume. This operation usually requires about 20 hours. The mixture is cooled and treated with ether and aqueous potassium bicarbonate; and the organic solution separated, washed with equeous potassium bicarbonate, dried over anhydrous magnesium sulfate, and concentrated to dryness in vacuo. A solution of the residue in petroleum ether is passed over a column consisting of 200 parts of fuller's earth and the column eluted with petroleum ether. The petroleum ether solutions are combined and concentrated in vacuo to afford 3β,17-diacetoxyestra-5(10),16-diene. Recrystallization from ether-methanol affords the pure product, M.P. 128–130°;

$[\alpha]_D = +163°$

Example 3

To a stirred mixture of 17.2 parts of 3β,17-diacetoxyestra-5(10),16-diene, 30 parts of potassium carbonate, and 560 parts of carbon tetrachloride is added, at 0° over a period of 15 minutes, a solution of 4.8 parts of chlorine in 200 parts of carbon tetrachloride. The reaction mixture is treated with excess aqueous sodium thiosulfate and extracted with chloroform; and the organic extract washed with water, dried over anhydrous magnesium sulfate, and concentrated to dryness in vacuo. The residue is triturated with ether, then recrystallized from acetone-petroleum ether to afford pure 3β-acetoxy-16α-chloroestr-5(10)-en-17-one, M.P. about 208–218°.

By substituting an equivalent quantity of bromine or iodine and otherwise proceeding according to the herein described processes, 3β-acetoxy-16α-bromoestr-5(10)-en-17-one, M.P. 193–200° and 3β-acetoxy-16α-iodoestr-5-(10)-en-17-one, respectively, are obtained. The latter substance displays maxima in the infrared at 5.78 and 8.04 microns.

Example 4

A mixture of 4.2 parts of 3β-acetoxy-16α-chloroestr-5(10)-en-17-one, 50 parts of concentrated hydrochloric acid, and 800 parts of methanol is stirred at room temperature for about 20 hours. The reaction mixture is diluted with water and the resulting precipitate collected by filtration. Recrystallization from acetone-petroleum ether affords pure 16α-chloro-3β-hydroxyestr-5(10)-en-17-one, M.P. about 123–125°.

By substituting an equivalent quantity of 3β-acetoxy-16α-bromoestr-5(10)-en-17-one or 3β-acetoxy-16α-iodoestr-5(10)-en-17-one and otherwise proceeding according to the herein described processes, 16α-bromo-3β-hydroxyestr-5(10)-en-17-one, M.P. 87–90°, and 3β-hydroxy-16α-iodoestr-5(10)-en-17-one, respectively, are obtained.

Example 5

To a solution of 18 parts of 16α-chloro-3β-hydroxyestr-5(10)-en-17-one in 800 parts of acetone is added dropwise at 15°, 20 parts by volume of an aqueous solution containing 5.34 parts of chromium trioxide and 8.46 parts of concentrated sulfuric acid. The reaction mixture is diluted with water and extracted with benzene; and the benzene solution washed successively with water and aqueous potassium bicarbonate, dried over anhydrous magnesium sulfate, and concentrated to dryness in vacuo. Adsorption of the residue on silica gel followed by elution of the chromatographic column with 1% ethyl acetate in benzene and recrystallization from acetone-petroleum ether yields 16α-chloroestr-5(10)-ene-3,17-dione, M.P. about 153–158°.

By substituting an equivalent quantity of 3β-hydroxy-16α-iodoestr-5(10)-en-17-one and otherwise proceeding according to the herein described processes, 16α-iodoestr-5(10)-ene-3,17-dione is obtained.

Example 6

To a stirred mixture of 2 parts of lithium aluminum hydride and 600 parts of ether is added drop-wise a solution of 3.3 parts of 3β-acetoxy-16α-chloroestr-5(10)-en-17-one in 70 parts of tetrahydrofuran. Stirring is continued for about 10 minutes, then the mixture treated successively with water and dilute hydrochloric acid. The resulting mixture is extracted with ether and the ether extract washed successively with water and aqueous potassium bicarbonate, dried over anhydrous magnesium sulfate, and concentrated to dryness in vacuo to afford 16α-chlorestr-5(10)-ene-3β,17-diol. This material can be separated into its two stereoisomers chromatographically. Adsoprtion on silica gel and elution with 5% ethyl acetate in benzene followed by recrystallization from acetone-petroleum ether affords pure 16α-chloroestr-5(10)-ene-3β,17α-diol, M.P. 178–180°

$[\alpha]_D = +147°$

Further elution of the column with 5% ethyl acetate in benzene and recrystallization from acetone-petroleum ether results in 16α-chloroestr-5(10)-ene-3β,17β-diol, M.P. 193–196°; $[\alpha]_D = +145°$.

When an equivalent quantity of 3β-acetoxy-16α-iodoestr-5(10)-en-17-one is substituted in the process disclosed herein, the resulting product is 16α-iodoestr-5(10)-ene-3β,17-diol.

Example 7

To a solution of 3.1 parts of 16α-chloroestr-5(10)-ene-3β,17β-diol in 25 parts of acetone is added dropwise at 5°, 2.5 parts by volume of an aqueous solution containing 0.67 part of chromium trioxide and 1.06 parts of concentrated sulfuric acid. The solution is diluted with water and extracted with benzene; and the benzene extract washed successively with water and aqueous potassium bicarbonate, dried over anhydrous magnesium sulfate, and concentrated to dryness in vacuo. Adsorption of the residue on magnesiated silica followed by elution with 5% ethyl acetate in benzene and recrystallization from acetone-petroleum ether affords 16α-chloro-17β-hydroxyestr-5(10)-en-3-one. This substance exhibits maxima in the infrared at 2.84 and 5.82 microns.

By substituting 16α-chloroestr-5(10)-ene-3β,17α-diol or 16α-iodoestr-5(10)-ene-3β,17-diol and otherwise proceeding according to the herein described processes, 16α-chloro-17α-hydroxyestr-5(10)-en-3-one, and 17-hydroxy-16α-iodoestr-5(10)-en-3-one, respectively, are obtained. The former hydroxy ketone exhibits infrared maxima at 2.81 and 5.82 microns.

Example 8

A mixture of 5 parts of 16α-chloroestr-5(10)-ene-3β,17β-diol, 50 parts of acetic anhydride, and 100 parts of pyridine is heated on the steam bath for 15 minutes, then allowed to stand at room temperature for 16 hours. Dilution of the mixture with water results in a precipitate which is collected by filtration and dried to afford 3β,17β-diacetoxy-16α-chloroestr-5(10)-ene. The product can be recrystallized from aqueous ethanol to yield the pure substance, which exhibits maxima in the infrared at 5.79 and 8.04 microns.

By substituting isovaleric anhydride and otherwise proceeding according to the herein described processes, 16α-chloro-3β,17β-diisovaleryloxyestr-5(10)-ene is obtained. This compound possesses maxima in the infrared at 5.79 and 8.05 microns.

Example 9

A mixture of one part of 16α-chloro-3β-hydroxyestr-5(10)-en-17-one, 15 parts of n-butyric anhydride, and 20 parts of pyridine is warmed on the steam bath to achieve solution, then allowed to stand at room temperature for 24 hours. The reaction mixture is diluted with water, and the resulting precipitate collected by filtration and dried to yield 3β-n-butyroxy-16α-chloroestr-5(10)-en-17-one. This compound displays maxima in the infrared at 5.78 and 8.05 microns.

Substitution of an equivalent quantity of 3β-hydroxy-16α-iodoestr-5(10)-en-17-one in the process described herein results in 3β-n-butyroxy-16α-iodoestr-5(10)-en-17-one.

What is claimed is:
1. A compound of the structural formula

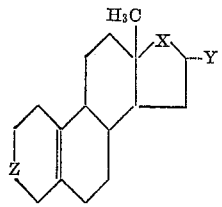

wherein X is selected from the group consisting of carbonyl, hydroxymethylene, and (lower alkanoyl)oxymethlene radicals; Z is selected from the group consisting of carbonyl, β-hydroxymethylene, and β-(lower alkanoyl)oxymethylene radicals; and Y is a halogen atom which has an atomic weight greater than 34.

2. 16α-chloro-3β-hydroxyestr-5(10)-en-17-one.
3. 16α-chloroestr-5(10)-ene-3β,17-diol.
4. 16α-chloroestr-5(10)-ene-3,17-dione.
5. 16α-bromo-3β-hydroxyestr-5(10)-en-17-one.
6. 3β,17-diacetoxyestra-5(10),16-diene.

References Cited in the file of this patent
UNITED STATES PATENTS

| | | |
|---|---|---|
| 2,681,353 | Archer | June 15, 1954 |
| 2,855,411 | Mueller | Oct. 7, 1958 |
| 2,855,412 | Mueller | Oct. 7, 1958 |
| 2,855,413 | Mueller | Oct. 7, 1958 |
| 2,857,403 | Fried et al. | Oct. 21, 1958 |